(12) United States Patent
Kagan et al.

(10) Patent No.: US 8,948,199 B2
(45) Date of Patent: Feb. 3, 2015

(54) FIBRE CHANNEL PROCESSING BY A HOST CHANNEL ADAPTER

(75) Inventors: Michael Kagan, Zichron Yaakov (IL); Ido Bukspan, Yehud (IL); Dror Goldenberg, Zichron Yaakov (IL); Itamar Rabenstein, Petach Tikva (IL); Hillel Chapman, Ein Ha-Emek (IL); Ariel Shachar, Jerusalem (IL); Diego Crupnicoff, Buenos Aires (AR)

(73) Assignee: Mellanox Technologies Ltd., Yokneam (IL)

( * ) Notice: Subject to any disclaimer, the term of this patent is extended or adjusted under 35 U.S.C. 154(b) by 845 days.

(21) Appl. No.: 12/398,194

(22) Filed: Mar. 5, 2009

(65) Prior Publication Data

US 2009/0201926 A1    Aug. 13, 2009

Related U.S. Application Data

(63) Continuation-in-part of application No. 11/847,367, filed on Aug. 30, 2007.

(60) Provisional application No. 60/823,903, filed on Aug. 30, 2006.

(51) Int. Cl.
*H04L 12/66* (2006.01)
*H04L 12/64* (2006.01)

(52) U.S. Cl.
CPC ............ *H04L 12/66* (2013.01); *H04L 12/6418* (2013.01)
USPC ......................................................... 370/466

(58) Field of Classification Search
CPC .... H04L 12/64; H04L 12/66; H04L 29/06068
USPC .......................................................... 370/466
See application file for complete search history.

(56) References Cited

U.S. PATENT DOCUMENTS

| 6,289,023 | B1 | 9/2001 | Dowling et al. |
| 6,400,730 | B1 | 6/2002 | Latif et al. |
| 6,427,071 | B1 | 7/2002 | Adams et al. |
| 7,114,009 | B2 * | 9/2006 | Jones et al. .................. 709/250 |
| 7,327,749 | B1 * | 2/2008 | Mott ............................ 370/413 |

(Continued)

FOREIGN PATENT DOCUMENTS

WO    2009136933 A1    11/2009

OTHER PUBLICATIONS

Voruganti, Kaladhar. "An Analysis of Three Gigabit Networking Protocols for Storage Area Networks" 20th IEEE International Performance, Computing, and Communications Conference. 2001.*

(Continued)

*Primary Examiner* — Huy D Vu
*Assistant Examiner* — Stephen J Clawson
(74) *Attorney, Agent, or Firm* — D. Kligler I.P. Services Ltd.

(57) ABSTRACT

A method for data storage includes mapping a queue pair (QP) of a channel adapter to a specified Fiber Channel (FC) exchange for communication with a storage device. Upon receiving at the channel adapter from a host computer a storage command directed to the storage device, the storage command is executed by transmitting data packets over a switched network from the channel adapter to the storage device using the specified exchange and performing a remote direct memory access (RDMA) operation on the channel adapter using the mapped QP.

18 Claims, 5 Drawing Sheets

(56) References Cited

U.S. PATENT DOCUMENTS

| | | | |
|---|---|---|---|
| 7,412,475 | B1 | 8/2008 | Govindarajalu |
| 7,447,975 | B2 | 11/2008 | Riley |
| 2002/0118640 | A1* | 8/2002 | Oberman et al. ............. 370/230 |
| 2003/0091037 | A1 | 5/2003 | Latif et al. |
| 2004/0022256 | A1* | 2/2004 | Green ........................ 370/401 |
| 2004/0208197 | A1 | 10/2004 | Viswanathan |
| 2004/0267902 | A1 | 12/2004 | Yang |
| 2006/0098681 | A1 | 5/2006 | Cafiero et al. |
| 2007/0091804 | A1* | 4/2007 | Pan et al. ..................... 370/230 |
| 2007/0208820 | A1* | 9/2007 | Makhervaks et al. ......... 709/212 |
| 2008/0056287 | A1 | 3/2008 | Kagan et al. |

OTHER PUBLICATIONS

Infiniband Architecture Specification vol. 1. Release 1.2. Infiniband Trade Association. Oct. 2004.*

U.S. Appl. No. 11/847,367 Official Action dated Apr. 29, 2010.

"Mellanox ConnectX IB: Dual-Port InfiniBand Adapter Cards with PCI Express 2.0", Mellanox Technologies, USA, 2008.

"Infiniband Architecture: Specification vol. 1", Release 1.2.1, Infiniband Trade Association, Nov. 2007.

Working Draft Project American National Standard T10/1799-D, "Information Technology—SCSI Block Commands—3 (SBC-3)", Revision 19, May 29, 2009.

Draft Proposed American National Standard T10/Project 1560-D "Information Technology—Fibre Channel Protocol for SCSI, Third Version (FCP-3)", Revision 3f, Mar. 23, 2005.

U.S. Appl. No. 11/847,367 Official Action dated Sep. 21, 2009.

U.S. Appl. No. 11/847,367 Official Action dated Jan. 28, 2011.

InterOperability Laboratory, "Fibre Channel Tutorial", 2011 University of New Hampshire.

U.S. Appl. No. 11/847,367 Official Action dated Oct. 4, 2010.

U.S. Appl. No. 11/847,367 Office Action dated Jul. 21, 2011.

* cited by examiner

FIBRE CHANNEL PROCESSING BY A HOST CHANNEL ADAPTER

CROSS-REFERENCE TO RELATED APPLICATION

This application is a continuation-in-part of U.S. patent application Ser. No. 11/847,367, filed Aug. 30, 2007 (and published as US 2008/0056287), which is a continuation-in-part of U.S. Provisional Patent Application 60/823,903, filed Aug. 30, 2006. These related applications are assigned to the assignee of the present patent application, and their disclosures are incorporated herein by reference.

FIELD OF THE INVENTION

The present invention relates generally to computer networks, and specifically to transport of storage-oriented traffic over switching networks.

BACKGROUND OF THE INVENTION

Fibre Channel (FC) is a high-speed network technology primarily used for storage networking. It has become the standard connection type for storage area networks (SAN) in enterprise storage. The Fibre Channel Protocol (FCP) is a transport protocol that is used to carry Small Computer System Interconnect (SCSI) commands over Fibre Channel networks. Fibre Channel standards have been promulgated by the T11 Technical Committee of the InterNational Committee for Information Technology Standards (INCITS).

U.S. Patent Application Publication 2006/0098681, whose disclosure is incorporated herein by reference, describes methods and devices for implementing a Low Latency Ethernet ("LLE") solution, also referred to as a Data Center Ethernet ("DCE") solution, which is said to provide a high bandwidth, low latency network for carrying Ethernet and storage traffic. One aspect of the description relates to a method for transforming FC frames into a format suitable for transport on an Ethernet network.

InfiniBand™ (IB) is a switched-fabric communications link primarily used in high-performance computing. It has been standardized by the InfiniBand Trade Association. Computing devices (host processors and peripherals) connect to the IB fabric via a network interface adapter, which is referred to in IB parlance as a channel adapter. Host processors (or hosts) use a host channel adapter (HCA), while peripheral devices use a target channel adapter (TCA).

SUMMARY

Embodiments of the present invention that are described hereinbelow provide devices and methods for efficient handling of FCP operations and communications by a channel adapter. Some of these methods use the remote direct memory access (RDMA) capabilities of the channel adapter to implement FCP storage commands efficiently, thus minimizing the burden of software processing on the host computer.

There is therefore provided, in accordance with an embodiment of the present invention, a method for data storage, including mapping a queue pair (QP) of a channel adapter to a specified Fibre Channel (FC) exchange for communication with a storage device. The method includes receiving at the channel adapter from a host computer a storage command directed to the storage device, and executing the storage command by transmitting data packets over a switched network from the channel adapter to the storage device using the specified exchange and performing a remote direct memory access (RDMA) operation on the channel adapter that targets the mapped QP.

In a disclosed embodiment, receiving the storage command includes receiving a list of one or more memory blocks from the host computer, and executing the storage command includes mapping a memory range for access by the channel adapter to the memory blocks, wherein the RDMA operation is performed over the mapped memory range. Additionally or alternatively, mapping the QP may include allocating a sub-range of queue pairs for FC communications out of a range of the queue pairs that is supported by the channel adapter, and selecting one of the queue pairs in the sub-range to correspond to each FC exchange used by the channel adapter in communicating with the storage device.

In one embodiment, receiving the storage command includes receiving a request from the host computer to store data on the storage device, and performing the RDMA operation includes generating and handling an inbound RDMA read request on the channel adapter with respect to the data. Additionally or alternatively, receiving the storage command includes receiving a request from the host computer to retrieve data from the FC storage device, and performing the RDMA operation includes generating and handling an inbound RDMA write request on the channel adapter with respect to the data.

In a disclosed embodiment, transmitting the data packets includes encapsulating a complete Fibre Channel frame inside a data packet of the switched network, and the switched network is selected from a group of types of switched networks consisting of Ethernet and InfiniBand switched networks.

There is also provided, in accordance with an embodiment of the present invention, a channel adapter, including a network interface, which is configured to communicate with a switched network, and channel adapter hardware, which is configured to accept a mapping of a queue pair (QP) of the channel adapter to a specified Fibre Channel (FC) exchange for communication with a storage device. The hardware is configured to receive from a client computer a storage command directed to the storage device, and to execute the storage command by transmitting data packets over the switched network to the storage device using the specified exchange and performing a remote direct memory access (RDMA) operation using the mapped QP to convey data between the network and a memory of the client computer.

There is additionally provided, in accordance with an embodiment of the present invention, apparatus for data storage, including a host processor and a memory, coupled to the host processor. A channel adapter is coupled to accept a mapping of a queue pair (QP) of the channel adapter to a specified Fibre Channel (FC) exchange for communication with a storage device, to receive from the host processor a storage command directed to the storage device, and to execute the storage command by transmitting data packets over a switched network to the storage device using the specified exchange and performing a remote direct memory access (RDMA) operation using the mapped QP to convey data between the network and the memory.

The present invention will be more fully understood from the following detailed description of the embodiments thereof, taken together with the drawings in which:

DETAILED DESCRIPTION OF EMBODIMENTS

Overview

While InfiniBand (IB) and high-speed Ethernet switched networks are widely used in server clusters and other high-speed computing environments, Fibre Channel (FC) remains the technology of choice in many storage area networks. It is therefore advantageous to enable intercommunication between an IB or Ethernet packet network and a FC network. For this purpose, the above-mentioned US 2008/0056287 describes novel methods of encapsulation of FCP frames in IB or Ethernet packets, as well as a gateway for connecting IB or Ethernet and FC networks and implementing these methods of encapsulation and de-encapsulation.

Modern IB channel adapters, such as the ConnectX™ HCA offered by Mellanox® Technologies (Santa Clara, Calif.), implement IB RDMA functions in hardware. The channel adapter is thus able to perform input/output (I/O) operations at very high speed while relieving the host processor of the burden of transport protocol processing. Although the ConnectX HCA is designed to meet IB specifications, its network ports can be configured for either IB or Ethernet, thus enabling it to transmit and receive Ethernet, as well as IB, packets. The term "channel adapter," as used in the present patent application and in the claims, should be understood as referring specifically to network interface devices that implement IB RDMA functions, as opposed to network interface devices of other types, such as FC Host Bus Adapters.

Embodiments of the present invention that are described hereinbelow exploit the RDMA capabilities of a HCA to execute FCP storage commands efficiently, without burdening the host processor. When the host processor initiates a FCP write operation, to store data on a FC target (such as a storage server), a RDMA read operation is invoked to transfer the data from the host memory to a switched network (such as an IB or Ethernet network) for transmission to the target. By the same token, when the host processor initiates a FCP read operation, to retrieve data from the FC target, the HCA uses RDMA write to deliver the data transmitted by the target to the host memory.

In order to carry out these functions, when the host processor initiates a FCP operation, the HCA maps an IB queue pair (QP) to the FC exchange that is specified in the FCP command submitted by the host processor. (The QP identifies a transport service instance in the HCA in accordance with IB standards, while the FC exchange identifies the sequence of FCP frames that are to be transmitted to or from the FC target.) The HCA also maps a memory range in memory translation and protection tables to correspond to the list of memory blocks specified by the host processor in the FCP command. To execute the storage command, the HCA sends a command packet over the switched network to the FC target using the specified exchange. In response to the command, the target invokes a remote direct memory access (RDMA) operation on the HCA using the mapped QP and memory range.

This arrangement permits FCP storage software applications, running on the host processor, to communicate with FC storage servers transparently, as though the host and storage server were connected directly by a FC network. In actuality, however, the FCP commands are translated into appropriate IB instructions by the HCA driver software for execution in hardware by the HCA. A similar arrangement may be used by an IB channel adapter (HCA or TCA) connected to a target storage server in order to translate and carry out—by means of RDMA read and write operations—FCP storage commands received from a host or other remote initiator.

System Description

Figure 1:
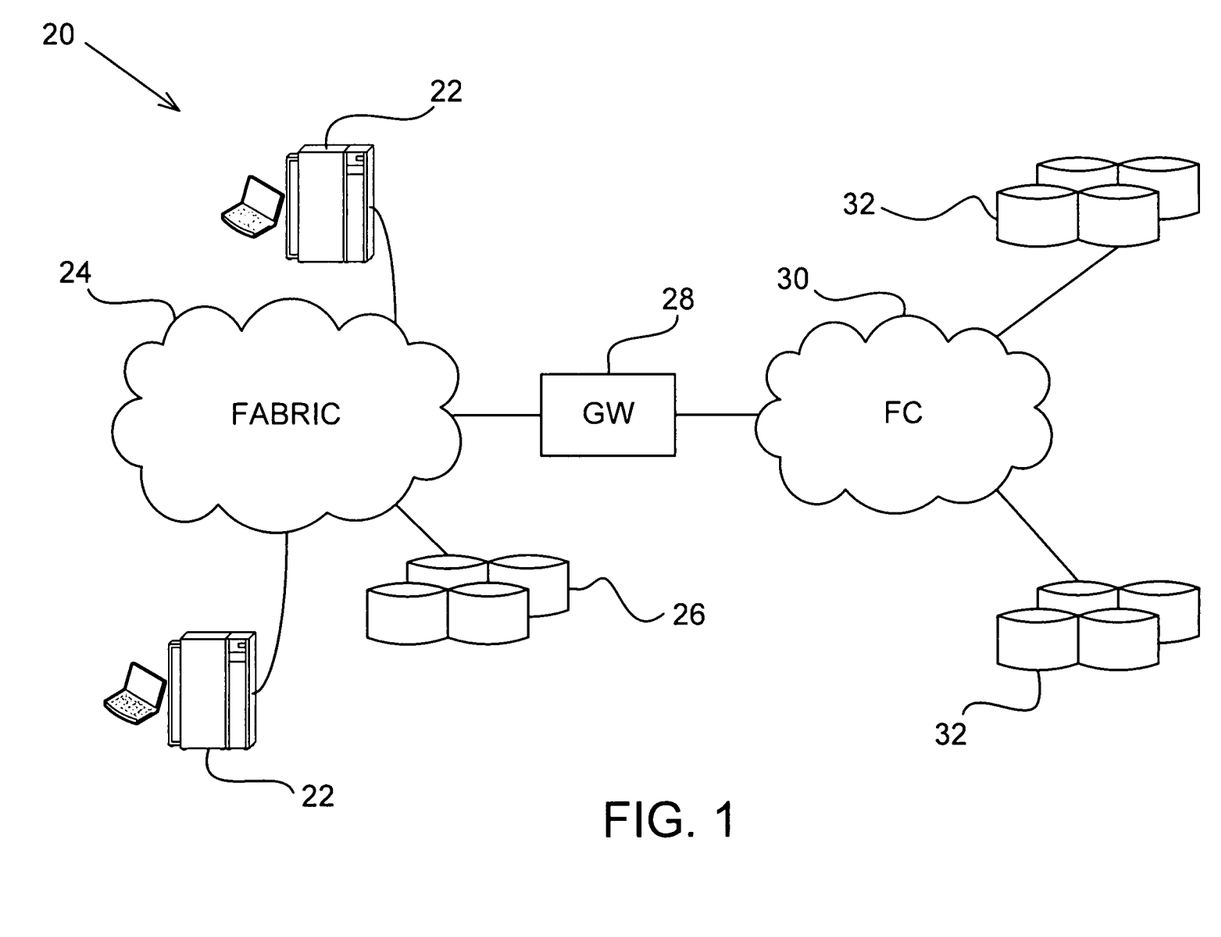
FIG. 1 is a block diagram that schematically illustrates a computer network system, in accordance with an embodiment of the present invention.

FIG. 1 is a block diagram that schematically illustrates a network communication system 20, in accordance with an embodiment of the present invention. One or more host computers 22 are connected to a switched network 24. In the description that follows, network 24 will be assumed, for convenience and clarity, to comprise an IB switched fabric. Alternatively, network 24 may comprise another type of switched network, such as an Ethernet network. Storage devices 26, such as network-attached disks or storage servers, may also be attached to network 24.

In the pictured embodiment, network 24 is connected via a gateway 28 to a FC network 30. One or more FC storage devices 32, such as FC storage servers, are connected to the FC network. When one of host computers 22 initiates a FC operation, specifying one of devices 32 as the target, the HCA of the host computer (as shown and described below) generates IB packets that encapsulate FCP frames directed to the target. The HCA transmits the IB packets to gateway 28, which de-encapsulates the FCP frames and transmits them over network 30 to the target device. The gateway likewise encapsulates FCP frames, returned over network 30 from devices 32, in IB packets having the appropriate destination address to reach the initiating host computer over network 24. For this purpose, the gateway maintains a table that translates between FC ID information (including FC source and destination addresses) and the corresponding IB header fields. The gateway is thus able to convey communication traffic between computers 22 and devices 32 without termination of the FC protocol. This feature of system 20 is described in detail in the above-mentioned US 2008/0056287 and is beyond the scope of the present patent application.

In other embodiments (not shown in the figures), the host computer communicates with a storage target using FCP without an intervening gateway. For example, the storage server may be connected to an IB or Ethernet network, and may perform appropriate de-encapsulation and encapsulation of the FCP frames that it receives and sends in a manner analogous to host computer 22. Generally speaking, the methods described herein enable the host computer and storage target to interact using FCP, regardless of the underlying network type.

Figure 2:
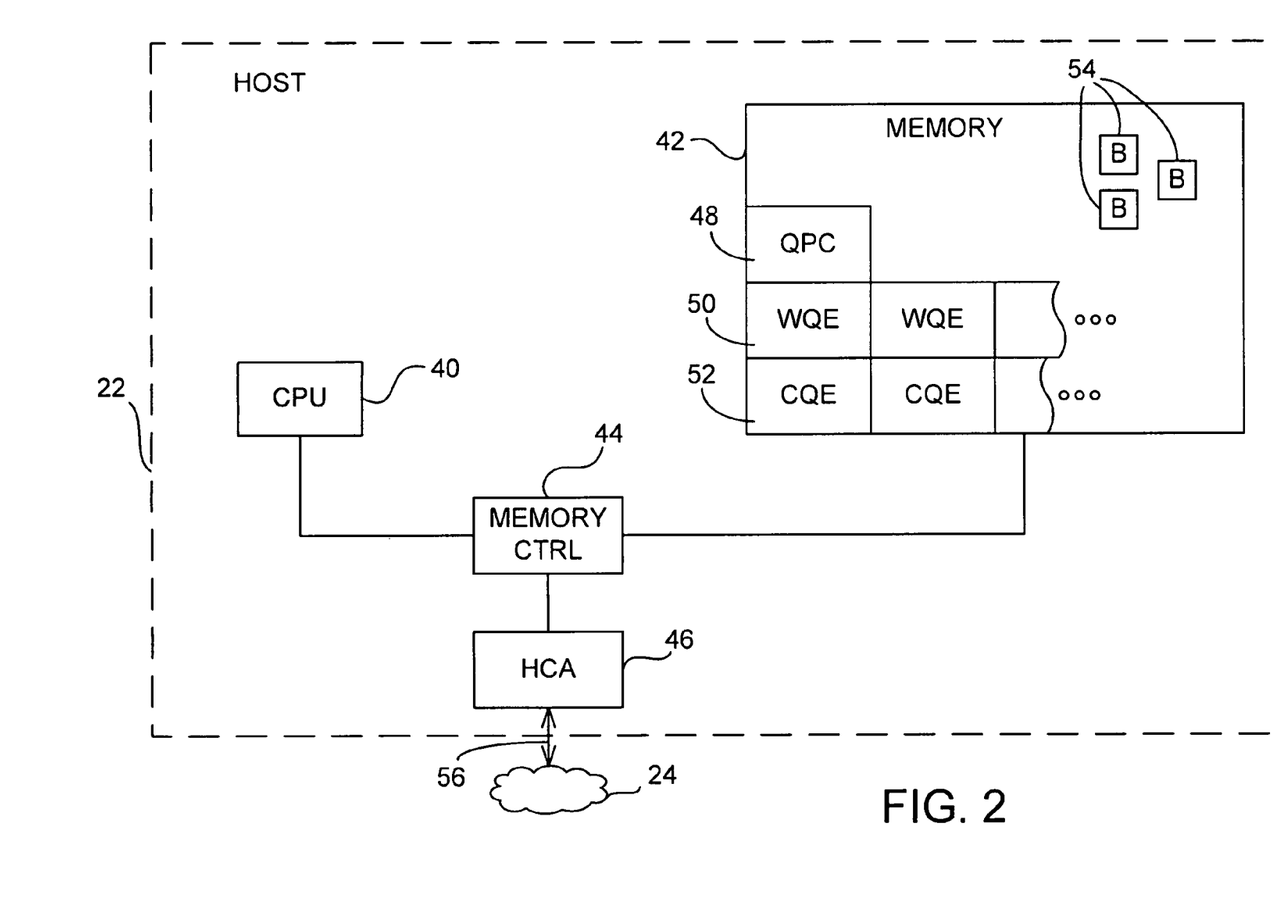
FIG. 2 is a block diagram that schematically shows details of a host computer, in accordance with an embodiment of the present invention.

FIG. 2 is a block diagram that schematically shows details of host computer 22, in accordance with an embodiment of the present invention. The computer comprises a host processor 40, which is typically a general-purpose central processing unit (CPU), and a system memory 42, connected to the host processor by a suitable memory controller 44, as is known in the art. A HCA 46 connects computer 22 to network 24 via a network link 56. As noted earlier, link 56 is typically an IB link, but it may alternatively be an Ethernet link or other suitable link supported by the HCA. Memory 42 holds data structures that are accessed and used by HCA 46, as described hereinbelow, as well as the host operating system, applications and other data (not shown), Client processes running on computer 22 communicate with the transport layer of the IB fabric by manipulating a transport service instance, known as a "queue pair" (QP), which is made up of a send work queue and a receive work queue. A given client may open and use multiple QPs simultaneously. Each QP has a QP context (QPC) 48, which is used and updated by HCA 46 in the course of processing communications on that QP. To send and receive communications over the fabric, the client process initiates work requests (WRs), which causes work items, called work queue elements (WQEs) 50, to be placed in the appropriate queues. The HCA then executes the work items. Upon completion of a work item, the HCA writes completion queue elements (CQEs) 52 to appropriate queues, which are then read by the client process as an indication that the WR in question has been completed.

For any given operation, the QP that initiates the operation, i.e. injects a message into network 24, is referred to as the requester, while the QP that receives the message is referred to as the responder. (A given QP can be both a requester and a responder in different operations.) An IB operation is defined to include a request message generated by the requester and, as appropriate, its corresponding response generated by the responder. (Not all request messages have responses.) Each QP is configured for a certain transport service type, based on how the requesting and responding QPs interact. There are four service types: reliable connection, unreliable connection, reliable datagram and unreliable datagram.

Each IB message consists of one or more IB packets, depending on the size of the message payload compared to the maximum transfer unit (MTU) of the message path. Typically, a given channel adapter will serve simultaneously both as a requester, transmitting request messages and receiving responses on behalf of local clients, and as a responder, receiving request messages from other channel adapters and returning responses accordingly. Request messages include, inter alia, RDMA write and send requests, which cause the responder to write data to a memory address at its own end of the link, and RDMA read requests, which cause the responder to read data from a memory address and return it to the requester. RDMA read and write requests specify the memory range to be accessed by DMA in the local memory of the responder. Send requests rely on the responder to determine the memory range to which the message payload will be written by means of an appropriate WQE placed in the responder's receive queue.

When computer 22 is to communicate with one or more FC devices 32, a range of QPs is allocated for this purpose by driver software of HCA 46. In the above-mentioned ConnectX HCA, for example, $2^{16}$ QPs may be allocated for serving FCP work requests (out of a total of $2^{24}$ QPs supported by the HCA). For active QPs in this range, the corresponding QPC 48 contains not only the usual IB context information, but also FC context parameters, such as exchange and ID information. These parameters are used by the HCA in generating encapsulated FCP frames and in responding to incoming FCP frames from FC devices.

To invoke a FCP operation, the FCP client process running on processor 40 specifies a list of blocks 54 in memory 42 and a FCP command to be carried out by the HCA. In response to this command, the HCA driver software maps a virtual memory range for use by the HCA and creates corresponding entries in the translation protection tables (TPT) of the HCA in order to link this virtual memory range to blocks 54. The TPT entries define the memory range and protection key that will be needed by the HCA subsequently to perform the RDMA operation without involving the host CPU, as provided by IB and other RDMA specifications. The HCA driver places an appropriate WQE in the queue in memory 42 and notifies the HCA hardware, which then uses its existing IB RDMA read/write machinery to fulfill the FCP command. Details of this process are described hereinbelow.

Figure 3:
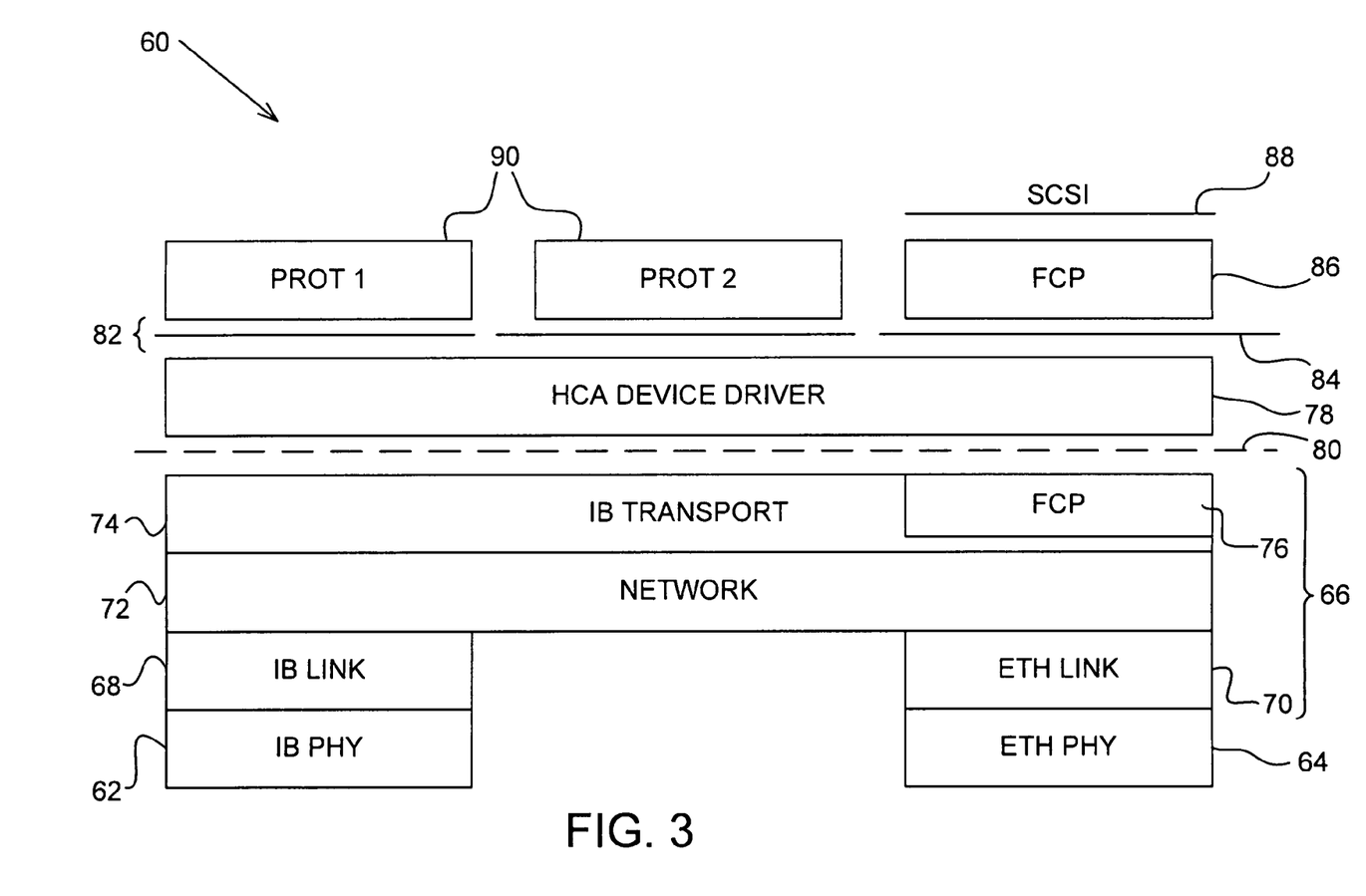
FIG. 3 is a block diagram that schematically illustrates a protocol stack used in handling FCP traffic via a HCA, in accordance with an embodiment of the present invention.

FIG. 3 is a block diagram that schematically illustrates a protocol stack 60 used in handling FCP traffic on computer 22, in accordance with an embodiment of the present invention. Depending on the type of network 24, the HCA connects to the network via either an IB physical layer interface (PHY) 62 or an Ethernet PHY 64. Lower protocol layers 66 are implemented in hardware by the HCA. These layers include either an IB link layer 68 or an Ethernet link layer 70. The link layer supports a network layer 72 and an IB transport layer 74. The IB transport layer implements the IB service types and transport protocols that were described above, including RDMA read and write operations, as described in IB specifications. Details of a hardware-based implementation of IB RDMA that may be used for this purpose are provided, for example, in U.S. Patent Application Publication 2002/0152327, whose disclosure is incorporated herein by reference.

In order to provide hardware support for transport of FCP frames, IB transport layer 74 is modified to add a FCP module 76. This module is invoked when traffic is to be transmitted or received on one of the QPs that has been allocated for transport of encapsulated FCP frames. The FCP module is responsible for creating outgoing FCP frames within IB and Ethernet packets created by the HCA hardware and for processing the FCP frames that are contained in the payloads of such packets when they are received by the HCA.

IB packets of this sort (both incoming and outgoing) have the following general form:

| IB L2H | IB TRH | FCPH | FC payload | FC CRC | IB CRC |
|---|---|---|---|---|---|

The packet begins with an IB link layer header (IB LRH) and transport header (IB BTH) and ends with IB cyclic redundancy check (CRC) fields, in accordance with IB convention. The transport header specifies, inter alia, the QP number, which in this case is one of the QPs that are allocated for FCP encapsulation.

The payload of the IB packet, enclosed in a double border in the diagram above, contains a complete FCP frame. This frame begins with a FCP header (FCPH), which specifies parameters including the FC ID, giving the source and destination addresses (for example, the address of storage device 32 and an address assigned to host computer 22 on FC network 30, in the configuration shown in FIG. 1) and exchange information. The FC payload contains command information and/or data, depending on the frame type. The encapsulated FCP frame ends with a FC CRC, in accordance with FCP specifications.

Details of the above packet structure are described further in the above-mentioned US 2008/0056287, which also describes similar encapsulation of FCP frames in Ethernet packets, as well as the operation of the gateway in encapsulating and de-encapsulating the FCP frames. An Ethernet packet of this sort may encapsulate a FCP frame directly, with appropriate assignment of VLAN and Ethernet type. Any of these options may be used in system 20.

The processes of generating, transmitting and receiving packets encapsulating FCP frames are described in detail with reference to FIGS. 4 and 5.

Returning now to FIG. 3, operation of HCA 46 is controlled in software by a HCA device driver 78 via a hardware interface 80. The device driver has a set of application programming interfaces (APIs) 82, which permits various client applications and protocols 90 to use the HCA in communicating via network 24, including invocation of the RDMA capabilities of the HCA. As noted above, the device driver performs functions such as QP allocation and memory mapping for use by these client applications.

As a part of the set of APIs, device driver 78 provides a FC host bus adapter (HBA) API 84 to a FCP application 86 running on host computer 22. The FCP application may comprise substantially any suitable sort of FCP client software, which typically exposes a SCSI interface 88. Device driver 78 makes HCA 46 appear to the FCP application to be a standard FC HBA network interface device. The device driver translates FCP commands from the FCP application into the appropriate IB WQEs for execution by the HCA, and similarly converts IB messages from the HCA into FC commands and data for use by the FCP application. In this manner, HCA 46 emulates a FC HBA, and it may, in fact, emulate multiple HBAs simultaneously, with a different QP (or multiple QPs) assigned to each of these virtual HBAs.

Method of Operation

In the description that follows, methods of intercommunication between a host computer with HCA and a FC storage device are described, by way of example, with reference to the system and device configurations shown in the preceding figures. It is assumed in these examples that network 24 is an IB fabric and that the host computer communicates with a storage server via a gateway, as in FIG. 1. The principles of these methods, however, may likewise be applied in other networks and host computer configurations. For example, network 24 may be an Ethernet network, and HCA 46 may be configured to transmit and receive Ethernet packets, as described above. As another example, the storage server may be connected to network 24 without an intervening gateway. The same sorts of encapsulation and RDMA functions that are described below may also be carried out by other types of channel adapters, such as TCAs, with appropriate protocol stacks. The operations of HCA 46 in the description below are carried out in hardware of the HCA unless specified otherwise.

Figure 4:
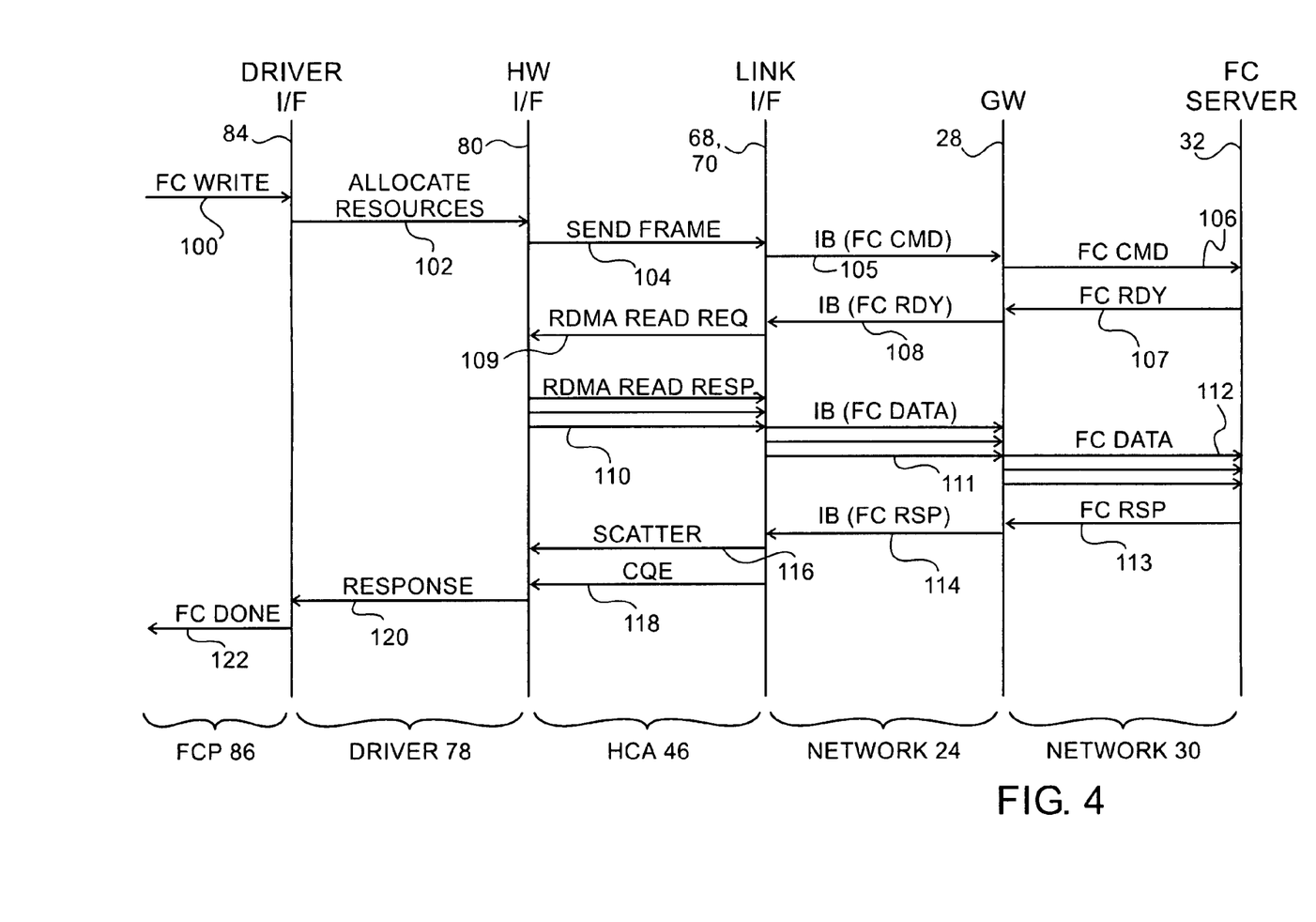
FIG. 4 is a communication flow diagram that schematically illustrates a method for carrying out a FCP write operation, in accordance with an embodiment of the present invention.

FIG. 4 is a communication flow diagram that schematically illustrates a method for carrying out a FCP write operation in system 20, in accordance with an embodiment of the present invention. The method is initiated when FCP application 86 submits a FC I/O write command 100 to driver 78. This stage of the interaction is handled by a FC command flow interface (FCMD) of HCA 46, via an IB Send QP. Each FCMD has a set of FC exchange flow interfaces (FCEXCH) for use in data transfers initiated by the FCMD, and may activate multiple exchange flows concurrently. Each FCEXCH is allocated its own send/receive QP. Driver 78 responds to command 100 initially by allocating resources 102 for serving the write operation. The resource allocation includes assigning a FCP exchange and associated QP and configuring the corresponding QP context 48 in memory 42, as well as mapping a virtual memory range to correspond to the blocks specified by command 100.

HCA 46 generates a FCP_CMND frame 104 on the Send QP. This command frame specifies parameters that include an indication of the SCSI write command that is to be carried out, the data size, and the initiator FC exchange. The HCA encapsulates frame 104 in an IB packet 105, which it then transmits over network 24 to gateway 28. Packet 105 indicates the QP of HBA 46 that is to be used by the gateway in its subsequent reply. Typically, packet 105, as well as subsequent packets in the FCP flow of FIG. 4, is transmitted using IB unreliable datagram (UD) service, although other types of IB service may alternatively be used. Gateway 28 de-encapsulates and transmits the FCP command in a FC frame 106 to FC server 32.

In accordance with FCP convention, FC server 32 responds to the write command by sending a FCP_XFER_RDY frame 107 to gateway 28. This frame echoes the initiator exchange from frame 104 and adds the target exchange to be used by the FC server. The gateway encapsulates frame 107 in an IB packet 108, which is addressed to HCA 46. The transport header of packet 108 contains the destination QP number that was specified in packet 105.

Upon receiving packet 108, HCA 46 checks the destination QP number and thus ascertains that the packet belongs to one of its virtual HBAs. FCP module 76 in the HCA then reads the header information from the encapsulated FC frame. If the header indicates that the FC frame contains data or a data transfer command, the FCP module uses the FC exchange information in the FC frame header to identify the FCEXCH QP that is to handle the FC frame.

Continuing the flow shown in FIG. 4, FCP module 76 recognizes the exchange in the encapsulated FCP_XFER_RDY frame 107 as belonging to write command 100, and thus identifies the QP that was allocated to handle this request. On this basis, the HCA identifies an inbound RDMA read request 109 and queues a RDMA read response for execution. (For example, the HCA may create its own "quasi-WQE" in memory 42 corresponding to the RDMA read request, and then queue this quasi-WQE for execution, as explained in the above-mentioned US 2002/0152327.) The RDMA read request specifies the memory range that was mapped for the write command at step 102.

When the RDMA read response reaches its turn for execution, HCA 46 uses the memory parameters in QP context 48 to identify and read out the appropriate blocks 54 from memory 42 for insertion into one or more RDMA read response packet payloads 110. FCP module 76 generates FCP_DATA frames, containing these payloads in the appropriate data format, with FCP headers specifying the appropriate addresses and exchange numbers. HCA 46 encapsulates the outgoing FCP_DATA frames in IB packets 111, which it transmits to gateway 28. The gateway de-encapsulates the packets and transmits FCP_DATA frames 112 to FC server 32.

As shown in FIG. 4, HCA 46 and gateway 28 may, in accordance with FC convention, transmit a sequence of multiple FCP_DATA frames in response to the FCP_XFER_READY command from FC server 32. Furthermore, after receiving the first sequence of FCP_DATA frames, the FC server may send additional FCP_XFER_READY frames in order to invoke transmission of further FCP_DATA frame sequences, until the entire data transfer is complete.

FC server 32 processes and stores the contents of FCP_DATA frames 112 in the normal way, and then returns a FCP_RSP frame 113 to indicate that the data were successfully received. Gateway 28 encapsulates this frame in an IB packet 114 with the appropriate QP number, and then transmits the packet to HCA 46.

HCA 46 again identifies packet 114 as containing a FCP frame based on the QP number, and FCP module 76 reads the encapsulated FCP header in order to determine the action to take. In this case, the HCA scatters message contents 116 to an appropriate location in memory 42, and places a CQE in the appropriate completion queue in the memory, to indicate that the FC I/O write operation has been successfully completed. Driver 78 reads the CQE and message contents, and accordingly generates a FCP response 120. The driver outputs the response to FCP application 86 in the form of a FCP I/O done command 122. Optionally, the FCP application may instruct the HCA driver to post a FCP confirmation (not shown in the figure), in which case the HCA sends an encapsulated FCP_CONF frame via gateway 28 to FC server 32.

Figure 5:
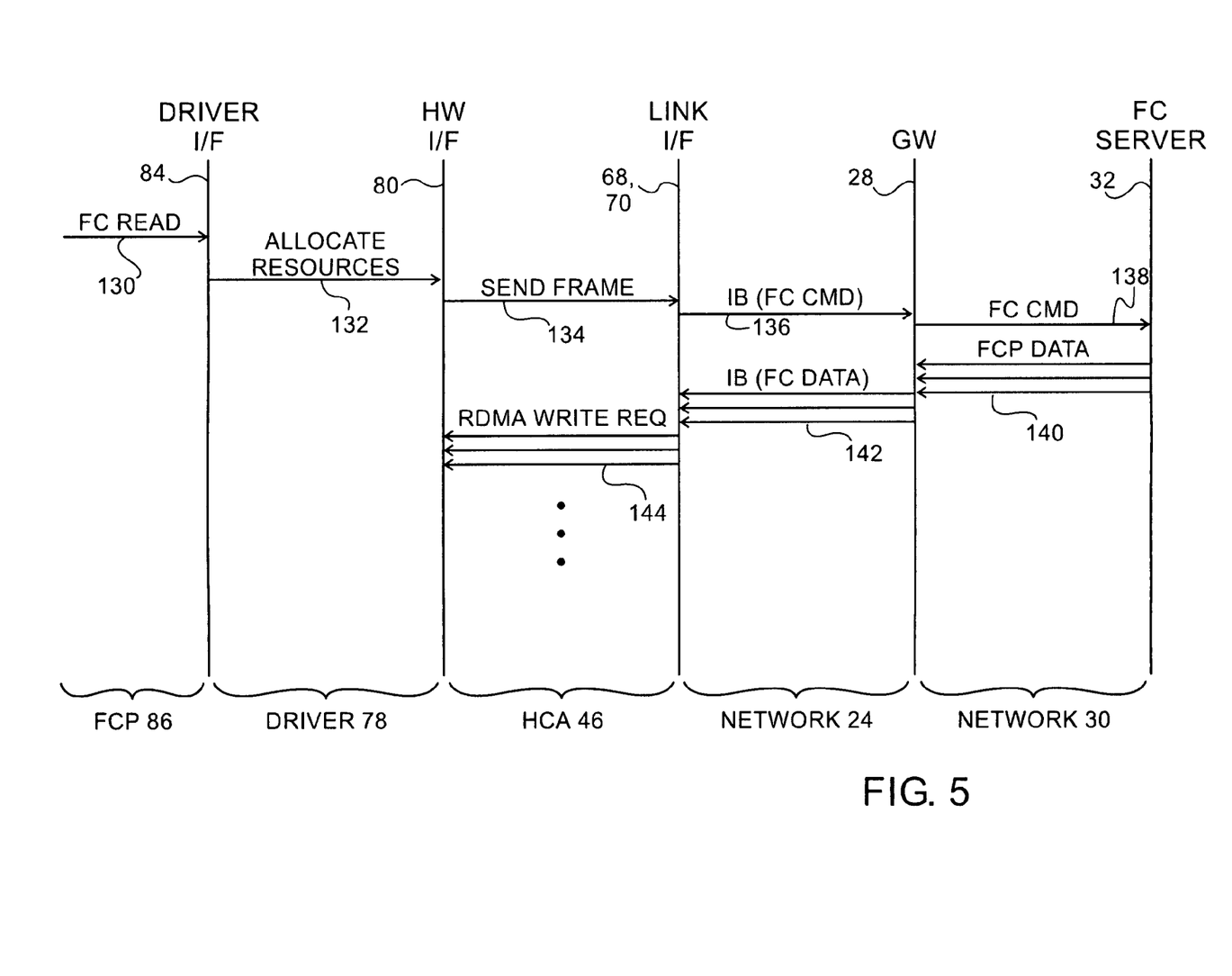
FIG. 5 is a communication flow diagram that schematically illustrates a method for carrying out a FCP read operation, in accordance with an embodiment of the present invention.

FIG. 5 is a communication flow diagram that schematically illustrates a method for carrying out a FCP read operation in system 20, in accordance with another embodiment of the present invention. The method in this case is initiated when FCP application 86 submits a FC I/O read command 130 to driver 78, asking to retrieve certain data blocks from FC server 32 to specified addresses in memory 42. Driver 78 allocates resources 132, including QP numbers, memory parameters, and a FC exchange identifier, and writes the appropriate parameters to the appropriate QP context in memory 42.

Driver 78 passes the read command to HCA 46, which generates a FCP command frame 134 that specifies the desired I/O read operation and identifies the FC exchange for reception of the read data. The HCA encapsulates this frame in an IB packet 36, and transmits the packet to gateway 28. The gateway de-encapsulates the packet and sends a corresponding FCP_CMND frame 138 via network 30 to FC server 32.

FC server 32 responds to the FCP_CMND frame by transmitting a sequence of one or more FCP_DATA frames 140 to gateway 28. The gateway encapsulates these frames into IB packets 142, and adds the appropriate destination address and QP number for transmission to computer 22.

Upon receiving these packets, HCA 46 checks the QP number and thus ascertains that the packets contain FCP data frames and passes them for processing to FCP module 76. The FCP module checks the exchange number of the incoming data frames and thus finds the QP number and associated context for receiving the data into memory 42. Based on the QP information, the HCA executes an inbound RDMA write request 144. The write request in this case specifies the memory range that was mapped for the read command at step 132. The HCA uses the memory parameters in QP context 48 to write the data sent by server 32 to the appropriate locations in memory 42.

Driver 78 notifies FCP application 86 that the data have been retrieved to memory 42, and the FCP read operation is thus completed. The remaining steps in the process are similar to those that were described above in reference to FIG. 4, and are therefore omitted here for the sake of brevity.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data storage, comprising:
    allocating a plurality of queue pairs (QPs) of a channel adapter for Fibre Channel (FC) communication with a storage device;
    mapping one of the QPs in the plurality to each FC exchange to be used by the channel adapter in communicating with the storage device;
    receiving at the channel adapter from a host computer a storage command directed to the storage device; and
    executing the storage command by transmitting data packets over a switched network from the channel adapter to the storage device using a specified FC exchange and performing a remote direct memory access (RDMA) operation on the channel adapter using the mapped QP.

2. The method according to claim 1, wherein receiving the storage command comprises receiving a list of one or more memory blocks from the host computer, and wherein executing the storage command comprises mapping a memory range for access by the channel adapter to the memory blocks, wherein the RDMA operation is performed over the mapped memory range.

3. The method according to claim 1, wherein receiving the storage command comprises receiving a request from the host computer to store data on the storage device, and wherein performing the RDMA operation comprises generating and handling an inbound RDMA read request on the channel adapter with respect to the data.

4. The method according to claim 1, wherein receiving the storage command comprises receiving a request from the host computer to retrieve data from the FC storage device, and wherein performing the RDMA operation comprises generating and handling an inbound RDMA write request on the channel adapter with respect to the data.

5. The method according to claim 1, wherein transmitting the data packets comprises encapsulating a complete Fibre Channel frame inside a data packet of the switched network.

6. The method according to claim 1, wherein the switched network is selected from a group of types of switched networks consisting of Ethernet and InfiniBand switched networks.

7. A channel adapter, comprising:
    a network interface, which is configured to communicate with a switched network; and
    channel adapter hardware, which is configured to allocate a plurality of queue pairs (QPs) of the channel adapter for Fibre Channel (FC) communication with a storage device, and to map one of the queue pairs in the plurality is selected to correspond to each FC exchange to be used by the channel adapter in communicating with the storage device, and to receive from a client computer a storage command directed to the storage device, and to execute the storage command by transmitting data packets over the switched network to the storage device using a specified FC exchange and performing a remote direct memory access (RDMA) operation using the mapped QP to convey data between the network and a memory of the client computer.

8. The channel adapter according to claim 7, wherein the channel adapter hardware is configured to receive a mapping of a memory range, for access by the channel adapter, corresponding to a list of one or more memory blocks submitted by the host computer, and to perform the RDMA operation over the mapped memory range.

9. The channel adapter according to claim 7, wherein the storage command comprises a request from the host computer to store data on the storage device, and wherein the RDMA operation comprises an inbound RDMA read request with respect to the data for execution by the channel adapter.

10. The channel adapter according to claim 7, wherein the storage command comprises a request from the host computer to retrieve data from the FC storage device, and wherein the RDMA operation comprises an inbound RDMA write request with respect to the data for execution by the channel adapter.

11. The channel adapter according to claim 7, wherein the channel adapter hardware is configured to encapsulate a complete Fibre Channel frame inside a data packet of the switched network.

12. The channel adapter according to claim 7, wherein the switched network is selected from a group of types of switched networks consisting of Ethernet and InfiniBand switching networks.

13. Apparatus for data storage, comprising:
   a host processor;
   a memory, coupled to the host processor; and
   a channel adapter, which is coupled to accept a mapping of a queue pair (QP) of the channel adapter to a specified Fibre Channel (FC) exchange for communication with a storage device, to receive from the host processor a storage command directed to the storage device, and to execute the storage command by transmitting data packets over a switched network to the storage device using the specified FC exchange and performing a remote direct memory access (RDMA) operation using the mapped QP to convey data between the network and the memory,
   wherein driver software running on the host processor is configured to allocate a plurality of queue pairs for FC communications, and to select one of the queue pairs in the plurality to correspond to each FC exchange to be used by the channel adapter in communicating with the storage device.

14. The apparatus according to claim 13, wherein the storage command comprises a list of one or more blocks in the memory, and wherein driver software running on the host processor is configured to map a memory range for access by the channel adapter to the memory blocks, wherein the RDMA operation is performed over the mapped memory range.

15. The apparatus according to claim 13, wherein the storage command comprises a request from the host processor to store data on the storage device, and wherein the channel adapter is configured to generate and handle an inbound RDMA read request in order to write the data from the memory to the network.

16. The apparatus according to claim 13, wherein the storage command comprises a request from the host processor to retrieve data from the storage device, and wherein the channel adapter is configured to generate and handle an inbound RDMA write request in order to read the data from the network into the memory.

17. The apparatus according to claim 13, wherein the channel adapter is configured to encapsulate a complete Fibre Channel frame inside a data packet of the switched network.

18. The apparatus according to claim 13, wherein the switched network is selected from a group of types of switched networks consisting of Ethernet and InfiniBand switched networks.

* * * * *